United States Patent Office 3,410,020
Patented Nov. 12, 1968

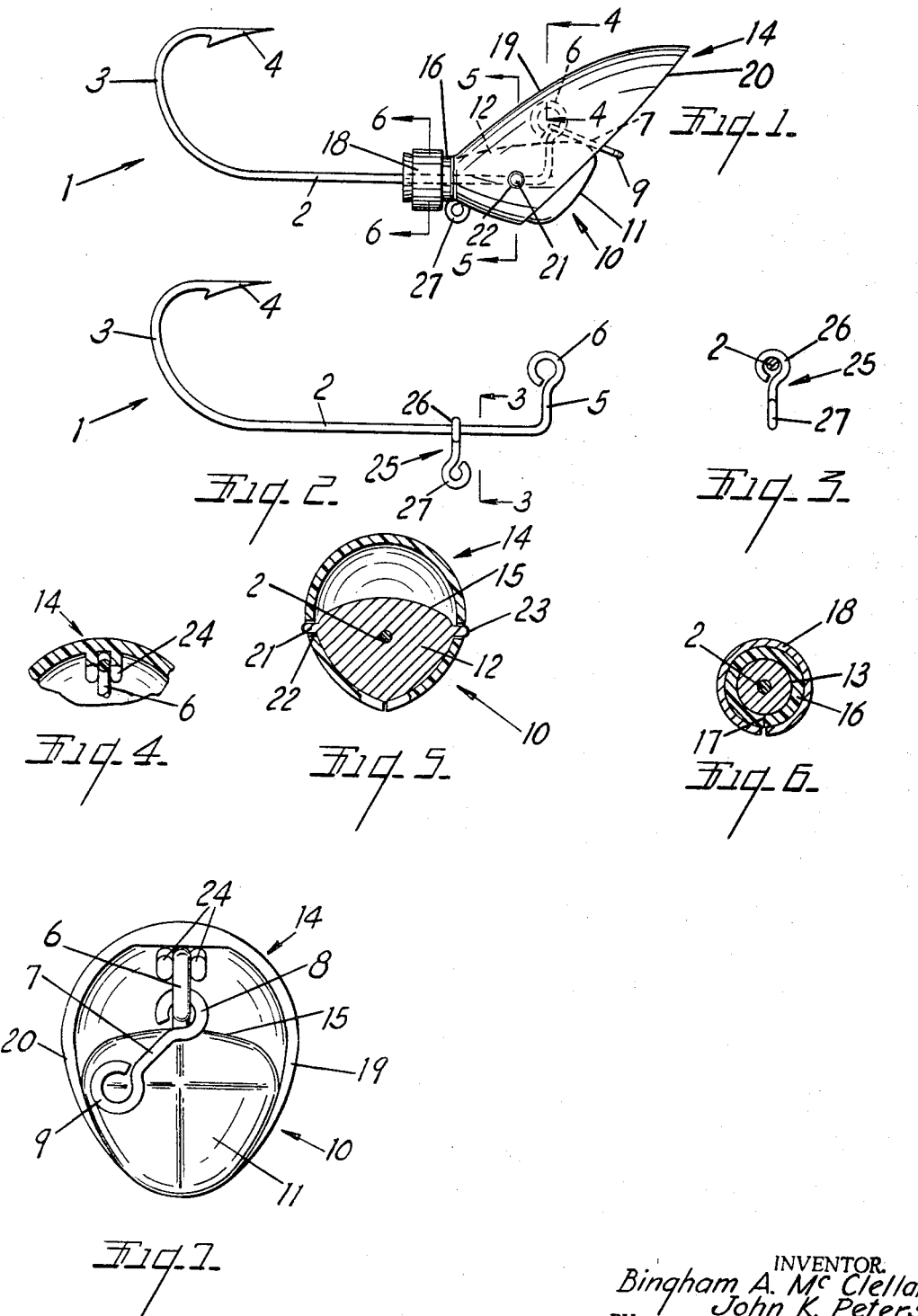

3,410,020
JIG TYPE FISH LURE
Bingham A. McClellan and John K. Peters, Traverse City, Mich., assignors to Burke-Flexo Products Company, Traverse City, Mich.
Filed Apr. 18, 1966, Ser. No. 543,144
2 Claims. (Cl. 43—42.34)

ABSTRACT OF THE DISCLOSURE

A weight mass molded around a bend in the shank of a hook with its eye projecting above the mass has an enlarged forward end with a downwardly and rearwardly inclined front face. A light weight scoop engages along the outside of the mass and extends in a forwardly and upwardly direction and has a concave front end. Projections on the sides of the mass engage in holes in the sides of the scoop and spaced projections on the inner top side of the scoop engage with the eye, and a split neck on the scoop is clamped to the mass by a clamp ring.

Outline of the invention

The invention provides a jig type weighted hook with a downwardly and forwardly opening scoop over the weight, so that sinking motion of the lure is modified by the resistance of the scoop through the water, and so that forward pulling motion on the line causes the scoop to impart an upward motion to the lure. The weight and the scoop have radially disposed and interengaged projections, so that the vertical motion creating effects of the scoop and weight remain in the same longitudinal plane as the barbed end of the hook.

Other objects and advantages of the invention will be apparent from a consideration of the following description and claims. The drawings, of which there is one sheet, illustrate a highly practical form of the improved jig lure.

FIGURE 1 is a side elevational view of the lure in assembled operative relation.

FIGURE 2 is a side elevational view of the main hook and auxiliary attaching eye used in the finished lure as shown in FIGURE 1.

FIGURE 3 is a vertical cross sectional view taken along the plane of the line 3—3 in FIGURE 2.

FIGURE 4 is a fragmentary vertical cross sectional view taken along the plane of the line 4—4 in FIGURE 1.

FIGURE 5 is a vertical cross sectional view taken along the plane of the line 5—5 in FIGURE 1.

FIGURE 6 is a vertical cross sectional view taken along the plane of the line 6—6 in FIGURE 1.

FIGURE 7 is a front elevational view of the completed lure.

Fish lures of the jig type are well known and consist generally of a weight mass such as a body of lead engaged around the forward end of the shank of a hook to cause the hook to sink when the line attached to the hook is paid out. It has also been known heretofore to improve the action of these jig lures by providing a forwardly facing scoop of relatively light and sometimes transparent material such as plastic over the jig weight with the rear end of the scoop tapering and converging rearwardly to a small end around the rear portion of the weight mass. As is well known these scoops cause the lure to be activated in a wiggling, swimming manner when the lure is retrieved or trolled. The hook, jig weight and scoop may be provided with natural or artificial bait or streamers which extend rearwardly over the rear portion of the shank of the hook and partially conceal the bend and barb of the hook.

In jig lures of the type just described it is desirable that the bend and barb of the main hook project upwardly in a vertical longitudinal plane through the shank of the hook and the center of the mass of the weight and the line attaching eye which is formed on the forward end of the hook. It is also desirable that the concave front end of the scoop remain symmetrically located relative to this vertical longitudinal plane. The present invention provides a main hook generally indicated at 1 and having an elongated shank 2 with an upwardly and forwardly turned bow or bend 3 on its rear end extending to the forwardly projecting barb 4. The forward end of the shank 2 is turned upwardly in the plane of the bow as at 5 and has a line attaching eye 6 formed therein. A dumbbell shaped wire link 7 has one eye 8 attached to the eye 6 on the hook shank and a separate eye 9 to which the line or leader is attached.

Positioned around the forward end of the shank 2 and the upturned portion 5 is a body or mass of weighting material such as lead, indicated generally at 10. The body has a forwardly enlarged head with a downwardly and rearwardly inclined front 11 and a rearwardly converging tapered body 12 secured around the shank of the hook as by being molded therearound. The extreme rear end of the jig weight 10 is generally cylindrical and concentric around the shank 2 of the hook, as is indicated at 13 in FIGURE 6, to form an attaching surface for the light weight plastic scoop indicated generally at 14. As appears more clearly in FIGURE 5 the jig weight 10 is of generally triangular cross section with rounded sides so that the top side 15 is spaced substantially below the inside of the scoop 14.

The scoop 14 has a cylindrical rear neck 16 which is slit longitudinally as at 17 to permit the neck to be snapped over the cylindrical rear end 13 of the mass. A split clamp ring 18 secures the neck of the scoop to the neck of the body. An alternate means of securing the scoop is by tying the scoop on with thread. This method is used when streamers are tied on the hook shank. The forward portion of the scoop 14 is generally symmetrical and of forwardly elliptical shape as at 19 so the lure sides of the scoop fit relatively closely around the rearwardly tapering lower sides of the weight mass 12 while the upper portion of the scoop diverges upwardly and forwardly from the upper surface 15 of the body, projecting over the eye 6. The forward end of the scoop is cut off along a downwardly and rearwardly inclined surface as indicated at 20. A line or leader attached to the eye 9 may thus extend forwardly or upwardly at a substantial angle to the axis of the shank of the hook.

In order to assure that the angle or position of the scoop 14 remains constant and symmetrical to the plane of the hook 1 the sides of the body are provided with oppositely extending bead-like projections 21 which extend into and engage the sides of holes 22 formed in the sides of the plastic scoop 14. The engagement between the projections and the edges of the holes prevent misaligning rotation of the scoop on the neck of the body even if the clamping action of the split ring 18 is relaxed. Desirably the ends of the projections 21 are given color coatings, indicated conventionally at 23, which contrast with the color of the weight body 10 and simulate the appearance of eyes of a small fish or bug. To further assure continued proper alignment of the scoop with the hook, the inside surface of the scoop is provided with laterally spaced inwardly projecting ribs 24 located midway along the top of the scoop to receive and laterally engage the top of the upstanding eye 6 of the main hook.

A load link for attaching lure dressings or a trailing hook to the main hook is indicated generally at 25 in FIGURES 2 and 3. The load link is a short link of wire having an upper eye 26 wrapped around the shank 2 of the main hook in a plane transverse to the shank of the hook. The lower end of the link projects from the bottom of the body and terminates in a second eye 27 arranged parallel to the plane of the main hook. The split lower edge 17 of the plastic scoop engages opposite sides of the load link to further prevent twisting of the scoop on the jig weight body 10. The load link 25 is engaged first with the shank of the main hook as shown in FIGURE 2 after which the jig weight body 10 is molded around the forward end of the shank and the upper end of the link to retain the parts in their desired position as illustrated. The plastic scoop 14 is easily snapped over the jig weight by spreading the sides of the scoop along the slit 17 and snapping the scoop over the jig weight with the interlocking engagements previously described in place between the scoop and the jig weight and the main hook. The lure is thus easily and relatively inexpensively assembled and accomplishes all of the objects of the invention set forth above.

What is claimed as new is:

1. A fish lure of the type having a weight mass molded around the forward end of the shank of a hook, and a forwardly and downwardly opening and interiorly concave scoop embracing said mass and projecting thereabove, characterized by:

a neck on the rear of said scoop secured around the rear end of said mass, radially inwardly extending and laterally spaced projections formed on the inside of said scoop, and a line attaching eye formed on the forward end of said shank and projecting from the surface of said mass to between said projections to prevent rotation of said scoop on said mass.

2. A lure as defined in claim 1 in which said mass further has radially extending projections on its sides and said scoop has holes in its sides, said projections being received in rotational restraining engagement in said holes.

References Cited

UNITED STATES PATENTS

| | | | |
|---|---|---|---|
| 1,599,763 | 9/1926 | Head | 43—42.39 X |
| 1,627,455 | 5/1927 | Peterson | 43—42.39 X |
| 1,842,591 | 1/1932 | Dunkelberger | 43—42.36 X |
| 2,215,971 | 9/1940 | Miles | 43—42.37 X |
| 2,927,392 | 3/1960 | Lievense et al. | 43—42.39 |
| 3,344,549 | 10/1967 | Peters et al. | 43—42.37 X |

SAMUEL KOREN, *Primary Examiner.*

J. H. CZERWONKY, *Assistant Examiner.*